_United States Patent Office_

3,547,952
Patented Dec. 15, 1970

3,547,952
7-MERCAPTO-COUMARINS
Asim Kumar Sarkar, Adel, England, assignor to Hickson & Welch Limited, Castleford, Yorkshire, England, a British company
No Drawing. Filed Mar. 13, 1968, Ser. No. 712,599
Claims priority, application Great Britain, Mar. 29, 1967, 14,348/67; Dec. 8, 1967, 56,036/67
Int. Cl. C07d 7/28
U.S. Cl. 260—343.2          18 Claims

ABSTRACT OF THE DISCLOSURE

This invention relates to coumarin derivatives having particularly advantageous properties as optical whitening agents.

BACKGROUND

This invention is concerned with new chemical compounds of use as optical whitening agents especially in the whitening and/or brightening of polyamide, polyester, acrylic and other synthetic fibres.

Optical whitening agents have in recent years found extensive use in the treatment of textile fibres, both in their preparation and during washing, and are designed in general to counteract the yellow or off-white colour which white textiles may develop. Such optical whitening agents also tend to improve coloured textiles as they impart a general brightness to them.

The present invention is based upon the discovery of certain coumarin derivatives which have particularly advantageous properties as optical whitening agents.

SUMMARY OF INVENTION

According to the present invention, there are provided compounds of the general formula:

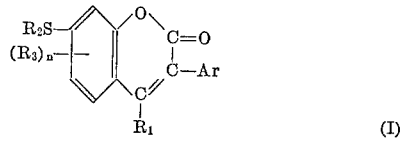

(I)

wherein:

$R_1$ represents a hydrogen atom or an alkyl group;
$R_2$ represents an unsubstituted or substituted (e.g. phenyl- or hydroxy-substituted) alkyl group;
$R_3$ represents an alkyl group;
Ar represents a phenyl group either unsubstituted or substituted by one or more non-ionogenic and non-chromophoric groups; and
$n$ represents 0 or an integer from 1 to 3.

As stated above, the compounds according to the invention have particularly advantageous properties as optical whitening agents. In particular, they have excellent brightening properties for synthetic fibres (e.g. polyamide, acrylic and more especially polyester fibers) when applied from aqueous acid, aqueous neutral and aqueous detergent baths, have favourable fluorescent properties wtih a desirable shade of blue-violet fluorescence, have good light fastness and have good stability to chlorine-containing or oxygen bleach baths.

DETAILED DESCRIPTION

In compounds of Formula I in which $R_1$, $R_2$ and/or $R_3$ represent an alkyl group, the said alkyl group preferably contains from 1 to 4 carbon atoms and is advantageously a methyl or ethyl group. When $R_2$ represents a substituted alkyl group, the substituent may for example be a halogen e.g. chlorine atom a hydroxy group or an aryl e.g. phenyl group; $R_2$ may thus for example represent a β-chloroethyl, β-hydroxyethyl or benzyl group. As stated above, $R_3$ preferably represents a methyl or ethyl group and, where $n$ is 1 or 2, the 6-methyl, 8-methyl, and 6,8-dimethyl coumarin derivatives are preferred. Ar preferably represents an unsubstituted phenyl group but may for example represent a phenyl group substituted by alkyl (e.g. a methyl), alkoxy (e.g. methoxy), alkylamino, dialkylamino, acylamino, halo- (e.g. chloro-) or cyano groups e.g. by a cyano group in the 4-position. Especially preferred compounds of Formula I are the compounds in which $R_1$ represents a hydrogen atom, $R_2$ represents a methyl group and Ar represents an unsubstituted phenyl group. Compounds of Formula I having alkyl substituents in the 5-, 6- and/or 8-positions in general have especially good light fastness.

For the purpose of treating textile fibres in general, the compounds according to the invention may advantageously be incorporated into compositions comprising at least one compound of Formula I together with a solid or liquid carrier. Such compositions may for example be adapted for use in the washing of finished polyamide, polyester and acrylic fibres, and can take the form of solutions, suspensions and dispersions of compounds of Formula I in appropriate liquid carriers such as for example water, sulpholane, dimethylformamide and dimethylsulphoxide. When dispersions are used, they conveniently include dispersing agents such as for example alkyl naphthalene sulphonates. Aqueous compositions may if desired also contain for example synthetic detergents, soaps or surface active agents. Alternatively the compositions may be in solid form and comprise at least one compound according to the invention together with a solid synthetic detergent or soap as carrier. The compounds of Formula I may also be employed in the manufacture of synthetic fibers, e.g. by addition to compositions from which the fibers are prepared by spinning or extrusion.

The coumarin derivatives of Formula I may be prepared by any convenient method, but are advantageously prepared by one of the following processes:

(a) Reaction of a compound of formula

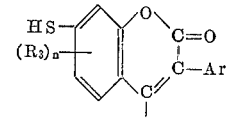

(II)

(wherein $R_1$, $R_3$, Ar and $n$ are as hereinbefore defined) with an appropriate alkylating agent. The alkylating agent may for example be an alkyl halide, and methyl iodide is preferably used in the preparation of compounds of Formula I wherein $R_2$ represents a methyl group. The compounds of Formula II used as starting material can for example be prepared by diazotisation of a compound of formula

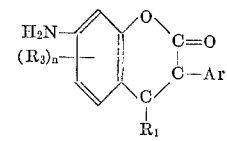

(III)

followed by conversion of the diazonium group thus formed in the 7-position to a thiocyano group and subsequent hydrolysis. The preparation of 3-phenyl-7-aminocoumarin, which is a compound of Formula III which may be used as a starting material for this reaction is described in U.S. patent specification No. 2,929,822. The compounds of Formula II (wherein $R_1$=H) may alternatively be prepared by reaction of an aldehyde of formula

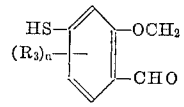

(IV)

(wherein $R_3$ and $n$ are as hereinbefore defined) with a cyanide of formula $$Ar\text{—}CH_2\text{—}CN \quad (V)$$

(wherein Ar is as hereinbefore defined) to form a compound of formula

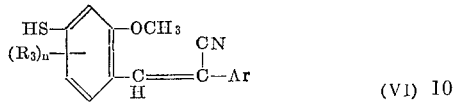
(VI)

followed by cyclisation for example in the presence of aluminium chloride or pyridine base to form the desired compound of Formula II.

(b) Reaction of an aldehyde of formula

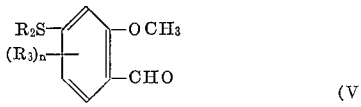
(VII)

(wherein $R_2$, $R_3$ and $n$ are as hereinbefore defined) with a cyanide of formula $$ArCH_2CN \quad (V)$$

(wherein Ar is as hereinbefore defined) to form a compound of formula

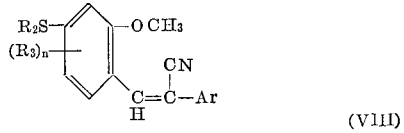
(VIII)

followed by cyclisation for example in the presence of aluminium chloride or pyridine base to form the desired compound of Formula I in which $R_1$ is hydrogen.

(c) Reaction of a coumarin derivative of formula

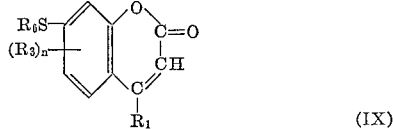
(IX)

(wherein $R_1$, $R_3$ and $n$ are as hereinbefore defined and $R_6$ represents a hydrogen atom or any of the groups which may be represented by $R_2$) with a diazonium compound of formula $$ARN_2Cl \quad (X)$$

and, where $R_6$ represents hydrogen, reacting the compound so formed with an appropriate alkylating agent.

In order that the invention may be well understood, the following examples are given by way of illustration only:

EXAMPLE 1

3-phenyl-7-aminocoumarin (8 pts.) was diazotised with sodium nitrite (2.5 pts.), hydrochloric acid (10 pts.), acetic acid (10 pts.) and water (20 pts.). The diazonium salt slurry was added to a solution of potassium thiocyanate (3.7 pts.) in water (50 pts.) and ferrous sulphate (2 pts.). At the completion of the reaction 7 pts. of crude 3-phenyl-7-thiocyanocoumarin was obtained which was crystallised from a mixture of 1 pt. toluene and 2 pts. of petroleum ether. M.P. 188–190° C.

3-phenyl-7-thiocyanocoumarin (7 pts.), sodium sulphide (13.5 pts.), ethanol (9 pts.) and water (50 pts.) were heated at 70° C. for 1 hr. The resultant mixture was acidified with hydrochloric acid and the precipitate washed with water. The product, 3-phenyl-7-mercaptocoumarin, was purified by dissolving in aqueous alkali and reprecipitation with hydrochloric acid. The product was crystallised from toluene. M.P. 214–216° C.

The 3-phenyl-7-mercaptocoumarin (3.4 pts.) was then methylated with methyl iodide (2.5 pts.) in dilute ethanolic caustic soda to give 3-phenyl-7-methylthiocoumarin, M.P. 155–7° C., $E^{1\%}_{1cm.}$ 1020 at 354 mμ.

EXAMPLE 2

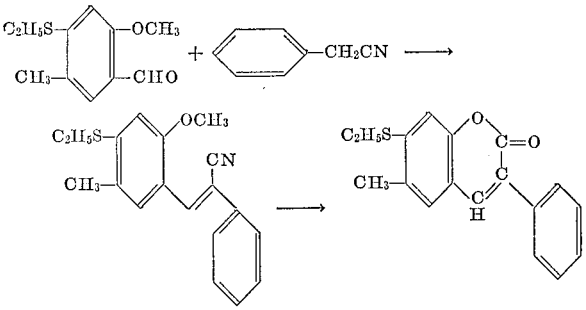

2-methoxy-4-ethylthio-5-methyl-benzaldehyde (6 pts.), benzyl cyanide (3.5 pts.) and ethanol (80 pts.) were heated to 50–60° C. and a few drops of caustic soda solution (sp. gr. 1.5) were added. The solution was maintained at 50–60° C. for ½ hr. after which it was cooled in ice and the yellow crystals obtained were filtered off, washed with ethanol and dried to give 7.5 pts. of the compound of Formula XII (M.P. 106–107° C.).

The compound of Formula XII (7.5 pts.) was refluxed in chlorobenzene (40 pts.) with anhydrous aluminium chloride (15 pts.) for 2 hrs. The reaction mixture was then poured into cold water and chlorobenzene steam distilled off. The product was filtered, washed with water and recrystallised from alcohol to give 3.5 g. of 3-phenyl-6-methyl-7-ethylthiocoumarin, M.P. 155–156° C.

$E^{1\%}_{1cm.}$ 975 at 358 mμ.

The following compounds were prepared by a method analogous to that described in Example 2:

| | λmax. $E^{1\%}_{1cm.}$ | M.P., °C |
|---|---|---|
| 3-phenyl-6-methyl-7-methylthio-coumarin | 1,010 at 361 mμ | 182–4 |
| 3-phenyl-6-methyl-7-isopropylthio-coumarin | 964 at 362 mμ | 188–90 |
| 3-phenyl-7-ethylthio-coumarin | 960 at 354 mμ | 131–2 |
| 3-phenyl-7-β-hydroxyethylthio-coumarin | 850 at 352 mμ | |
| 3-(p-cyanophenyl)-7-methylthio-coumarin | 1,040 at 364 mμ | |
| 3-(p-tolyl)-7-methylthio-coumarin | 1,000 at 354 mμ | 148–50 |
| 3-(p-chlorophenyl)-7-methylthio-coumarin | 1,000 at 357 mμ | 180–2 |
| 3-(3':4':dichlorophenyl)-7-methylthio-courmarin. | 870 at 361 mμ | |
| 3-(p-tolyl)-6-methyl-7-methylthio-coumarin | 960 at 362 mμ | 184–6 |
| 3-(p-chlorophenyl)-6-methyl-7-methylthio-coumarin. | 780 at 366 mμ | 163–5 |
| 3-(p-methoxyphenyl)-6-methyl-7-methyl-thiocoumarin. | 850 at 364 mμ | 220–221 |
| 3-(p-chlorophenyl)-4-methyl-7-methyl-thiocoumarin. | 720 at 340 mμ | 164–6 |

EXAMPLE 3

A bleached fabric of "Terylene" was treated at a fabric to liquor ratio of 1:4 for 30 mins. at the boil with 0.2% dispersion (referred to the weight of the fabric) of 3-phenyl-6-methyl-7-ethylthio-coumarin. After rinsing and drying the sample of Terylene fabric had a brilliant and bluish white shade.

Similar results are obtained with other compounds the preparation of which is described in Examples 1 and 2.

We claim:

1. A compound of the formula:

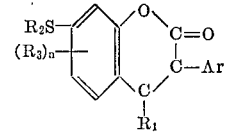
(I)

wherein:

$R_1$ represents a hydrogen atom or alkyl group containing 1 to 4 carbon atoms;

$R_2$ represents an alkyl group containing 1 to 4 carbon atoms either unsubstituted or substituted by a phenyl or hydroxy group;

$R_3$ represents an alkyl group containing 1 to 4 carbon atoms;

Ar represents a phenyl group either unsubstituted or substituted by one or more alkyl or alkoxy groups containing 1 to 4 carbon atoms or chloro or cyano groups; and $n$ represents 0 or an integer from 1 to 2.

2. A compound as claimed in claim 1 in which at least one of $R_1$, $R_2$ and $R_3$ represents a methyl or ethyl group.

3. A compound as claimed in claim 1 in which $R_2$ represents a benzyl or β-hydroxyethyl group.

4. The compound of claim 1 which is 3-phenyl-7-methylthiocoumarin.

5. The compound of claim 1 which is 3-phenyl-6-methyl-7-ethylthiocoumarin.

6. The compound of claim 1 which is 3-phenyl-6-methyl-7-methylthiocoumarin.

7. The compound of claim 1 which is 3-phenyl-6-methyl-7-isopropylthiocoumarin.

8. The compound of claim 1 which is 3-phenyl-7-ethylthiocoumarin.

9. The compound of claim 1 which is 3-phenyl-7-benzylthiocoumarin.

10. The compound of claim 1 which is 3-phenyl-7-β-hydroxyethylthiocoumarin.

11. The compound of claim 1 which is 3-(p-cyanophenyl)-7-methylthiocoumarin.

12. The compound of claim 1 which is 3-(p-tolyl)-7-methylthiocoumarin.

13. The compound of claim 1 which is 3-(p-chlorophenyl)-7-methylthiocoumarin.

14. The compound of claim 1 which is 3-(3':4'-dichlorophenyl)-7-methylthiocoumarin.

15. The compound of claim 1 which is 3-(p-tolyl)-6-methyl-7-methylthiocoumarin.

16. The compound of claim 1 which is 3-(p-chlorophenyl)-6-methyl-7-methylthiocoumarin.

17. The compound of claim 1 which is 3-(p-methoxyphenyl)-6-methyl-7-methylthiocoumarin.

18. The compound of claim 1 which is 3-(p-chlorophenyl)-4-methyl-7-methylthiocoumarin.

References Cited

UNITED STATES PATENTS 3,351,482  11/1967  Raue _____ 260—343.2X

HENRY R. JILES, Primary Examiner

J. M. FORD, Assistant Examiner

U.S. Cl. X.R.

252—8.6, 301.2; 260—152, 240